US012696938B2

(12) United States Patent
Stockall et al.

(10) Patent No.: US 12,696,938 B2
(45) Date of Patent: Aug. 4, 2026

(54) AEROSOL GENERATION DEVICE

(71) Applicant: JT International SA, Geneva (CH)

(72) Inventors: Adrian Peter Stockall, Grand-Saconnex (CH); Gordon Montgomery, Ballymena County (GB)

(73) Assignee: JT International S.A., Geneva (CH)

( * ) Notice: Subject to any disclaimer, the term of this patent is extended or adjusted under 35 U.S.C. 154(b) by 900 days.

(21) Appl. No.: 17/767,778

(22) PCT Filed: Oct. 7, 2020

(86) PCT No.: PCT/EP2020/078063
§ 371 (c)(1),
(2) Date: Apr. 8, 2022

(87) PCT Pub. No.: WO2021/069471
PCT Pub. Date: Apr. 15, 2021

(65) Prior Publication Data
US 2023/0141931 A1     May 11, 2023

(30) Foreign Application Priority Data
Oct. 9, 2019     (EP) ..................................... 19202144

(51) Int. Cl.
*A24F 40/65*        (2020.01)
*G06F 3/01*        (2006.01)
(Continued)

(52) U.S. Cl.
CPC ................ *A24F 40/65* (2020.01); *G06F 3/01* (2013.01); *G06F 3/06* (2013.01); *H04W 76/10* (2018.02)

(58) Field of Classification Search
CPC ....................................................... A24F 40/65
See application file for complete search history.

(56) References Cited

U.S. PATENT DOCUMENTS

2013/0145457 A1     6/2013  Papakipos et al.
2013/0284192 A1    10/2013  Peleg et al.
(Continued)

FOREIGN PATENT DOCUMENTS

CN        105453598 A      3/2016
CN        107666837 A      2/2018
(Continued)

OTHER PUBLICATIONS

International Search Report for Application No. PCT/EP2020/078063 mailed Jan. 11, 2021, 1-5 pages.
(Continued)

*Primary Examiner* — Russell E Sparks
*Assistant Examiner* — Michael T Fulton
(74) *Attorney, Agent, or Firm* — Lerner David LLP

(57) ABSTRACT

An aerosol generation device can generate an aerosol for inhalation by a user. The device 2 includes a data storage unit configured to store data relating to user interactions and an interface configured to establish a communicative pairing with a user computation device. Processor is configured to delete any data relating to user interactions with the aerosol generation device that were previously stored in the data storage unit when a user computation device associated with a new user is successfully paired with the interface. In another arrangement, a flag can be set in the data storage unit when a user computation device has successfully paired with the interface so that the storage of data in the data storage unit is enabled when the flag has been set, and otherwise the storage of data in the data storage unit is inhibited.

16 Claims, 5 Drawing Sheets

(51) Int. Cl.
   *G06F 3/06*         (2006.01)
   *H04W 76/10*        (2018.01)

(56)                References Cited

U.S. PATENT DOCUMENTS

| 2016/0070746 A1 | 3/2016 | Bender et al. |
| 2016/0106936 A1 | 4/2016 | Kimmel |
| 2016/0346489 A1 | 12/2016 | Finke et al. |
| 2018/0160734 A1 | 6/2018 | Batista et al. |
| 2019/0221130 A1 | 7/2019 | Gamygin et al. |

FOREIGN PATENT DOCUMENTS

| CN | 109690658 A | 4/2019 | |
| EP | 3098738 A1 * | 11/2016 | ............. A24F 40/53 |
| EP | 3000245 B1 | 2/2018 | |

OTHER PUBLICATIONS

Search Report dated Mar. 20, 24 from the Office Action for Chinese Application No. 202080070543.4 Issued Mar. 26, 2024, pp. 1-2.

* cited by examiner

AEROSOL GENERATION DEVICE

The present application is a national phase entry under 35 U.S.C. § 371 of International Application No. PCT/EP2020/078063, filed Oct. 7, 2020, published in English, which claims priority from European Application No. 19202144.2 filed Oct. 9, 2019, the disclosures of which are incorporated herein by reference.

The present invention relates to an aerosol generation device and in particular an aerosol generation device that can be paired with a user computation device such as a smartphone.

Aerosol generation devices such as electronic cigarettes are becoming increasingly popular. Different kinds of aerosol generation mechanism can be used, depending on consumer preference. Some devices involve heating, rather than burning, an aerosol generating substrate to produce an aerosol for inhalation. Other devices can store a vaporisable liquid in a reservoir and can vaporise the liquid in an air flow channel, typically using an electrical heater.

An attractive feature of some of these devices is their ability to 'connect' with other user computation devices, such as a smartphone or a personal computer. This can allow a user to have a more immersive experience and to synchronise interaction with the aerosol generation device with other devices and events in their life. Aerosol generation devices can therefore record data relating to user interactions and share these data with other connected devices. An object of the present invention is to improve the security with which these data are handled and accessed.

According to an aspect of the present invention there is provided an aerosol generation device configured to generate an aerosol for inhalation by a user, the device comprising: a data storage unit configured to store data relating to user interactions with the aerosol generation device; an interface configured to establish a communicative pairing with a user computation device; and a controller configured to perform an action in relation to the data storage unit based on a flag that is set in the data storage unit, the flag indicating the status of a pairing between the interface and a user computation device.

In this way, the status of the data storage unit can be altered depending on connections between the aerosol generation device and a user computation device. This can improve data security within the aerosol generation device.

Preferably, performing an action in relation to the data storage unit based on a flag that is set in the data storage unit comprises altering a status of the data storage unit based on a status of a flag that is set in the data storage unit. In other words, the controller may be configured to alter a status of the data storage unit based on a status of a flag that is set in the data storage unit, the flag indicating a status of paring between the interface and a user computation device.

In one arrangement the controller may be configured to delete any data relating to user interactions with the aerosol generation device that were previously stored in the data storage unit when the flag indicates that a user computation device associated with a new user is successfully paired with the interface. In this way, stored data that may relate to a previous user can be deleted when a user computation device associated with the new user is successfully paired. This can prevent communication of potentially sensitive data created by one user to a device associated with a different user. The new user is preferably identifiable by being different to a previous user of the device. Alternatively, where there is no previous user, the new user may be the first identifiable user of the device. The deleted data are preferably data that are stored in read only memory; for example, data stored in a solid state storage device.

The aerosol generation device is preferably an electronic cigarette. The user computation device is preferably a smartphone. A wide variety of alternative interactive user computation devices could also be used such as a laptop computer or a wearable computing device such as a watch.

Following the deletion of data, the controller is preferably configured to store data relating to interactions with the aerosol generation device. These stored interactions are therefore assumed interactions by the new user. The aerosol generation device can store these data in memory with the intention of transferring them to a user computation device associated with the user when an appropriate device is next paired with the aerosol generation device.

The controller may be configured to send stored data to the user computation device using the interface when the user computation device associated with the new user is paired. This can ensure that data are only sent to the new user's device where it can be reasonably concluded that those usage data were generated by the relevant user. The sending of stored data may include accessing those stored data from the user computation device.

Preferably the controller is configured to store an indication of the new user when the user computation device associated with the new user is successfully paired with the interface. For example, the indication may correspond to a unique user ID. Notably, the user ID may be independent of any specific user computation device. This can allow the same user to interface with the aerosol generation device using different devices (such as a smartphone and a personal computer, or two different smartphones) without causing deletion of stored data relating to their interactions with the aerosol generation device.

The indication is preferably received from the user computation device via the interface. For example, the indication may be an electronic token that is associated with the new user's account. The indication can be stored in a flag in the data storage unit.

The controller may be configured to compare the indication received from the user computation device with a stored indication in the data storage unit in order to determine whether the communicative pairing is associated with the new user. This comparison can also reveal that the indication received from the user computation device is associated with a current user of the aerosol generation device (i.e. there has been no change in the identity of the user and the indication received from the user computation device matches the stored indication). In these circumstances there is no deletion of historic usage data, since these data can be safely transferred to the user computation device that is associated with the current user of the device.

The interface is preferably configured to establish a communicative pairing with user computation devices using a wireless protocol. The wireless protocol is preferably Bluetooth®, but other protocols such as Wi-Fi could be used in appropriate circumstances. In an alternative configuration a wired connection may be established between the aerosol generation device and the user computation device.

In one arrangement the controller may be configured to set a flag in the data storage unit when a user computation device has successfully paired with the interface and to enable storage of data in the data storage unit when the flag has been set and otherwise to inhibit storage of data in the data storage unit. This can permit protection of sensitive data because the device is inhibited from storing data until a user computation device has been successfully paired. This means that sensitive data generated by a user cannot be accessed by another party pairing their device with the aerosol generating device because no data are even stored in the data storage unit until at least one communicative pairing has been established.

The device preferably includes one or more sensors configured to detect user interactions, wherein the one or more sensors are deactivated when storage of data in the data storage unit is inhibited. In an alternative, the one or more sensors may be active but storage of data related to the detected user interactions can be prevented electronically.

According to another aspect of the invention there is provided a method of using an aerosol generation device that can generate an aerosol for inhalation by a user, the method comprising the steps of: providing a data storage unit configured to store data relating to user interactions with the aerosol generation device; establishing a communicative pairing with a user computation device associated with a new user, using an interface of the aerosol generation device; and performing an action in relation to the data storage unit based on the status of a flag in the data storage unit, the flag indicating the status of a pairing between the interface and a user computation device.

Preferably, performing an action in relation to the data storage unit based on the status of a flag in the data storage unit comprises altering a status of the data storage unit based on a status of a flag that is set in the data storage unit. In other words, the method may comprise altering a status of the data storage unit based on a status of a flag that is set in the data storage unit, the flag indicating a status of paring between the interface and a user computation device.

According to yet another aspect of the invention there is provided a non-transitory computer readable memory product comprising executable instructions that when executed by a computer cause the computer to undertake steps comprising: establishing a communicative pairing with a user computation device associated with a new user, using an interface of the aerosol generation device; and performing an action in relation to a data storage unit which is configured to store data relating to user interactions with the aerosol generation device based on the status of a flag in the data storage unit, the flag indicating the status of a pairing between the interface and a user computation device.

Preferably, performing an action in relation to the data storage comprises altering a status of the data storage unit based on a status of a flag that is set in the data storage unit. In other words, the steps may comprise altering a status of a data storage unit which is configured to store data relating to user interactions with the aerosol generation device based on a status of a flag that is set in the data storage unit, the flag indicating the status of a pairing between the interface and a user computation device.

According to another aspect there is provided an aerosol generation device configured to generate an aerosol for inhalation by a user, the device comprising: a data storage unit configured to store data relating to user interactions with the aerosol generation device; an interface configured to establish a communicative pairing with a user computation device; and a controller configured to: enable storage of data in the data storage unit when a status of a flag that is set in the data storage unit indicates that a user computation device has successfully paired with the interface; inhibit storage of data in the data storage unit when a status of a flag that is set in the data storage unit indicates that a user computation device has not paired with the interface; and enable usage of the aerosol generation device to generate an aerosol, irrespective of the status of the flag.

The aerosol generation device may comprises one or more sensors configured to detect user interactions.

In some examples, the one or more sensors are deactivated when storage of data in the data storage unit is inhibited.

In other examples, the one or more sensors are active when storage of data in the data storage unit is inhibited but storage of data related to the detected user interactions in the data storage unit is prevented.

The controller may be configured to send stored data to the user computation device using the interface when the user computation device is paired.

According to yet another aspect there is provided a method of using an aerosol generation device that can generate an aerosol for inhalation by a user, the method comprising the steps of: providing a data storage unit configured to store data relating to user interactions with the aerosol generation device; establishing a communicative pairing with a user computation device associated with a new user, using an interface of the aerosol generation device; and enabling storage of data in the data storage unit when a status of a flag that is set in the data storage unit indicates that a user computation device has successfully paired with the interface; inhibiting storage of data in the data storage unit when a status of a flag that is set in the data storage unit indicates that a user computation device has not paired with the interface; and enabling usage of the aerosol generation device to generate an aerosol, irrespective of the status of the flag.

According to yet another aspect there is provided a non-transitory computer readable memory product comprising executable instructions that when executed by a computer cause the computer to undertake steps comprising: establishing a communicative pairing with a user computation device associated with a new user, using an interface of the aerosol generation device; and enabling storage of data relating to user interactions with the aerosol generation device in a data storage unit when a status of a flag that is set in the data storage unit indicates that a user computation device has successfully paired with the interface; inhibiting storage of data relating to user interactions with the aerosol generation device in a data storage unit when a status of a flag that is set in the data storage unit indicates that a user computation device has not paired with the interface; and enabling usage of the aerosol generation device to generate an aerosol, irrespective of the status of the flag that is set in the data storage unit.

Embodiments of the invention are now described, by way of example, with reference to the drawings, in which.

Figure 1:
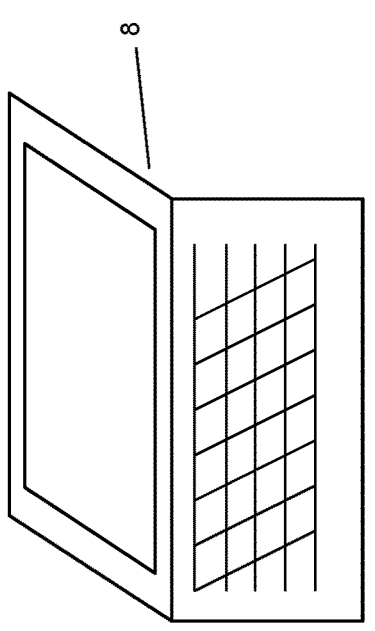
FIG. 1 is a schematic view of an aerosol generating device in communication with one or more user computation devices in an embodiment of the invention.
Figure 1:
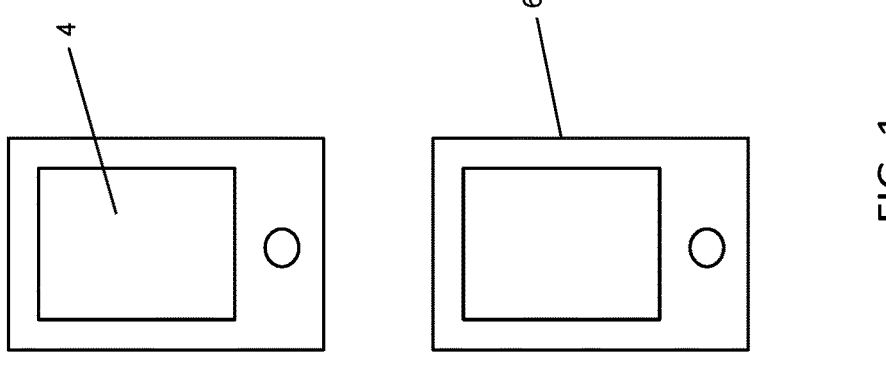
Figure 1:
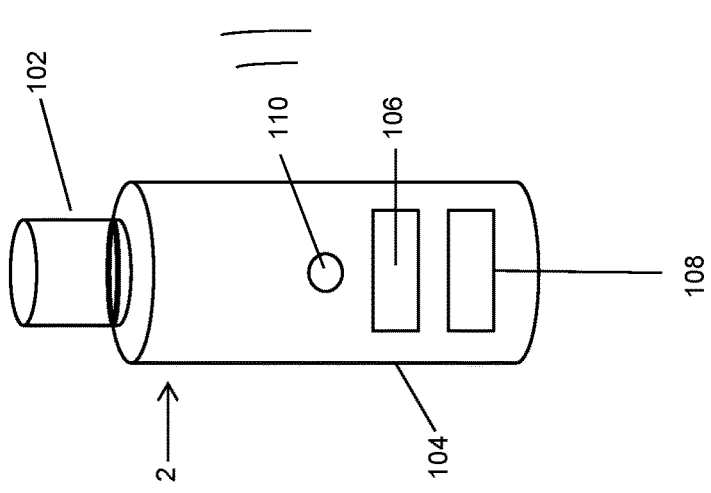

FIG. 1 is a schematic view of an aerosol generating device 2 or an electronic cigarette. The aerosol generating device 2 is configured to communicate wirelessly with one or more user computation devices 4, 6, 8. In this schematic example the user computation devices include a first smartphone 4, a second smartphone 6 and a laptop computer 8. Any number of different kinds of user computation devices may be used including wearable devices such as smartwatches or headsets.

In this embodiment the aerosol generating device 2 has a main body 104 and a mouthpiece portion 102. The main body 104 comprises a battery 106 for providing power, and a processor 108 or controller for controlling operation. The main body 104 can further include a user operable button 110 for functions such as switching the device 2 on and off, and engaging a heater of an atomizer (not shown) to vaporise a vaporisable liquid from a liquid store. The present invention is not limited to use with aerosol generating devices that vaporise a vaporisable liquid. Equally the invention can be used with aerosol generating devices that can generate an aerosol based on different operational principles such as those that heat a tobacco substrate without burning it.

In the context of the present disclosure, an aerosol and a vapour can be considered interchangeable expressions. That is, an aerosol is a vapour and a vapour is an aerosol. An aerosol for smoking may refer to an aerosol with particle sizes of 0.5-7 microns. The particle size may be less than 10 or 7 microns.

Figure 2:
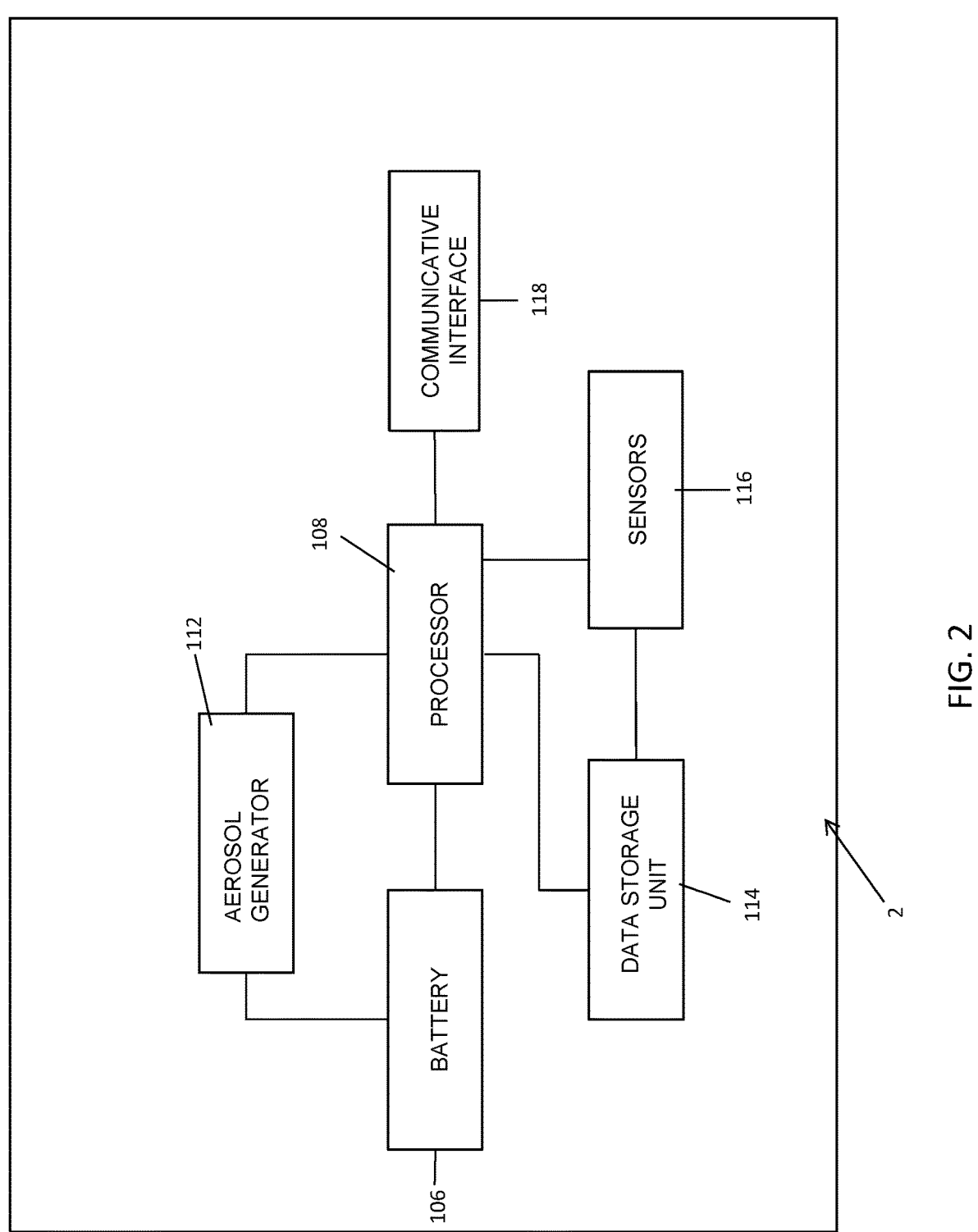
FIG. 2 is a schematic view of a control system in an aerosol generating device in an embodiment of the invention.

Further electronic components in the aerosol generating device 2 are apparent from the schematic diagram in FIG. 2. The processor 108 receives electrical power from the battery 106 and is operably connected to an aerosol generator 112 such as an atomizer or a heater. The processor 108 is further connected to a data storage unit 114 and one or more sensors 116. The data storage unit 114 is generally a solid state storage unit. Finally, the processor 108 is connected to a communicative interface 118 which can enable communication between the aerosol generating device 2 and the one or more user computation devices 4, 6, 8. In some embodiments the processor 108 may be a microcontroller.

The sensors 116 are configured to detect data which are related to usage of the aerosol generating device 2. For example, the sensors 116 can detect puff record data, which can include information on user inhalation events such as duration of inhalation, maximum recorded flow rate, rate of change of flow rate, evolution of flow rate, temperature in aerosol generator, amount of consumed nicotine or liquid, amount of consumed energy, time of day of puff and length of depression of activation button 110. Thus, the sensors 116 may include, for example, temperature sensors, flow rate sensors, electrical resistance detectors and the like. The sensors 116 can also detect event data, which also relate to some kind of user interaction with the device 2. Examples of event data include insertion of removal of a capsule or the occurrence of an error. Thus, the sensors 116 can include contact sensors, electrical sensors, Hall-effect sensors or photovoltaic sensors to detect insertion or removal of a capsule. The sensors 116 may also be implemented in software to detect events such as errors. Each instance of puff record data or event record data recorded by the sensors 116 can be associated with a time stamp.

Figure 3:
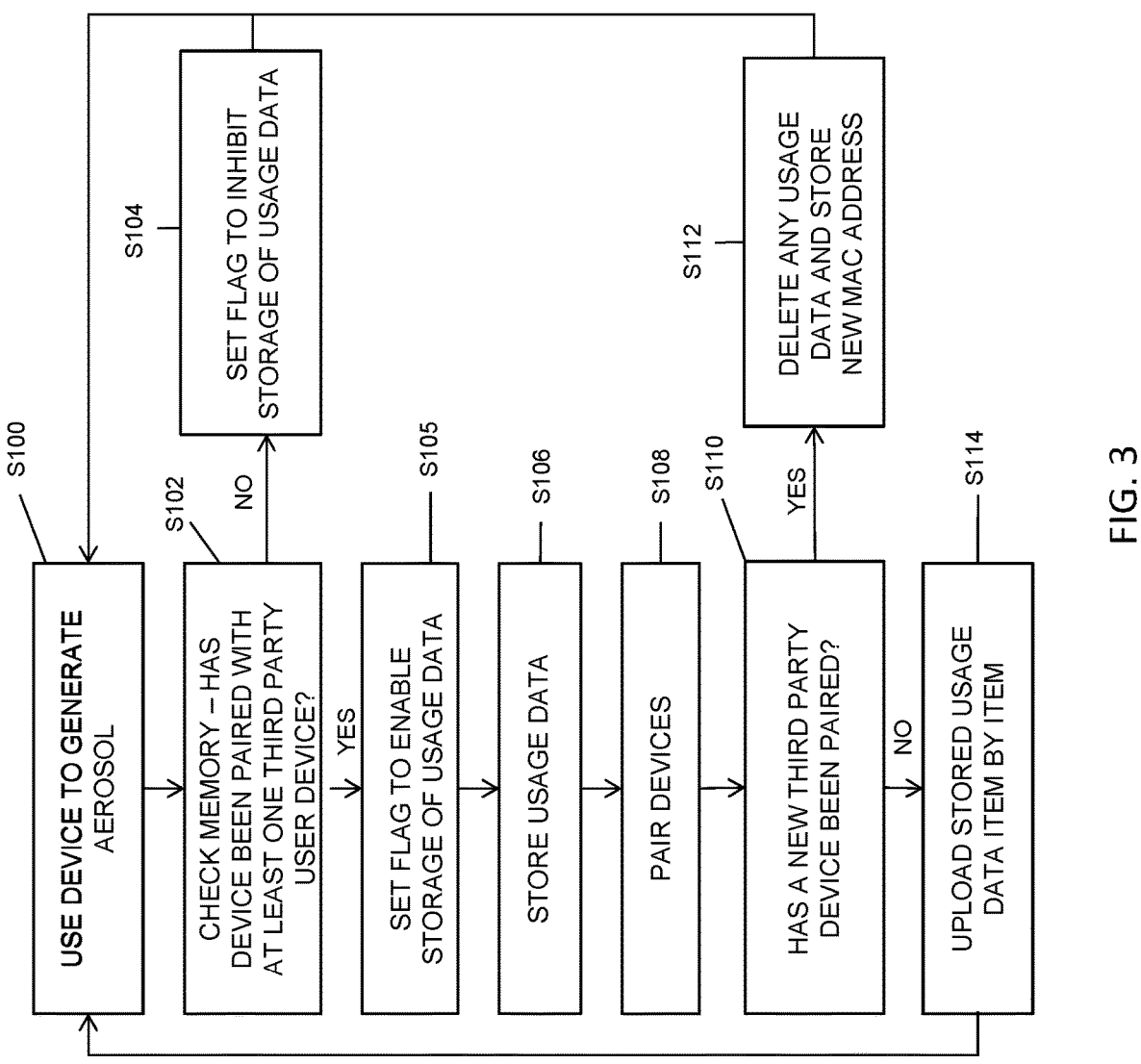
FIG. 3 is a flow diagram showing a sequence of steps to be undertaken in an aerosol generation device in an embodiment of the invention.

FIG. 3 is a flow diagram showing a sequence of steps that can be undertaken in an example embodiment of the present invention. At step S100 the device 2 is used for its normal purpose, which is to generate an aerosol for inhalation by a user. The user can inhale through the mouthpiece 102 while pressing the user operable button 110. An aerosol is produced by the aerosol generator 112 using electrical power supplied by the battery 106. At step S102 the processor 108 checks the data storage unit 114 to determine whether the device 2 has ever been paired with a user computation device 4, 6, 8. This is possible because, following pairing with a user computation device 4, 6, 8, the MAC address of the relevant device is stored in a whitelist or a flag in the data storage unit 114. At step S102, therefore, the processor 108 can check for the absence of any MAC address in the whitelist or flag in the data storage unit 114. The absence of a stored MAC address in the whitelist or flag can therefore indicate that no user computation device 4, 6, 8 has ever been successfully paired with the aerosol generating device 2. In such circumstances at step S104 the processor 108 can inhibit storage of any usage data in the data storage unit 114.

The storage of usage data can be inhibited in a number of possible ways. In one example, the sensors 116 can be deactivated by the processor 108 to ensure that no data are recorded for any usage events. In another example, the sensors 116 can remain activated but the detected puff and event data records are never committed to read only memory in the data storage unit 114.

At step S105, if it is determined that a user computation device has been successfully paired in the past, due to the presence of a MAC address in the data storage unit 114, storage of usage data in the data storage unit 114 is enabled by setting a flag in the data storage unit 114. Usage data are then stored in the data storage unit 114 at step S106. The usage data can include puff data records and event data records, as detected by the sensors 116.

The data storage unit 114 is designed to store up to 6000 puff records and 4000 event records. These data records are held in the data storage unit 114 until such time as it is possible to transfer the data records to a user device through a communicative pairing. Once a data record has been successfully transmitted to a user device it is deleted from the data storage unit 114. This releases storage space for new data records.

At step S108 in this exemplary flow diagram the aerosol generation device 2 is paired with one of the user computation devices 4, 6, 8. This is achieved by the communicative interface 118 in the aerosol generation device. In one embodiment a user computation device such as the first smartphone 4 is paired wirelessly using a protocol such as Bluetooth®. Of course, a number of alternative wireless protocols could also be used. Also, it would be possible to establish a communicative pairing by direct wired connection between the first smartphone 4 and the aerosol generation device 2, although this is generally less convenient for users.

At step S110 the processor 108 is configured to determine whether there has been a change in identity of the paired user computation device. This is achieved by examining the MAC address of the paired user computation device, and comparing this with the MAC address that is stored in the data storage unit 114, which represents the user computation device that was most recently paired with the aerosol generating device 2. If such a change is determined then at step S112 the processor 108 deletes any usage data in the data storage unit 114, including puff data records and event data records. This can prevent communication of potentially sensitive data to a different user computation device which may be associated with a new user. The MAC address for the newly paired user computation device is then stored in the data storage unit 114 at step S112. In some arrangements it is only possible to store one MAC address in the whitelist in the data storage unit 114 at any time.

If the MAC address of the paired user computation device matches the MAC address stored in the data storage unit 114 at step S110 then it can be concluded that there has been no change in the paired user computation device. In other words, it can be concluded that the currently paired user computation device is the same as the most recent previously paired user device. In these circumstances, at step S114, a data transfer with the user computation device is initiated. At step S114 the processor 108 is configured to transfer data records one by one from the data storage unit 114 to the paired user computation device via the communicative interface 118. This can allow a user to review usage records in an application in the user computation device and to display graphics and statistics related to their use. Data records are deleted from the data storage unit 114 once they have been transferred to the paired user computation device.

The flow diagram is then returned to step S100. Of course, continuous use of the device 2 is possible to generate aerosol, and normal use of the device is not frustrated by the performance of steps in the flow diagram of FIG. 3 which are purely illustrative of an embodiment of use.

The user can also delete any stored data in the data storage unit 114, including any MAC addresses in the whitelist, by selecting a 'factory reset' button. The factory reset button may be provided on the aerosol generation device 2. In an alternative, or in addition, a factory reset function may be provided in a software application on a paired user computation device.

Figure 4:
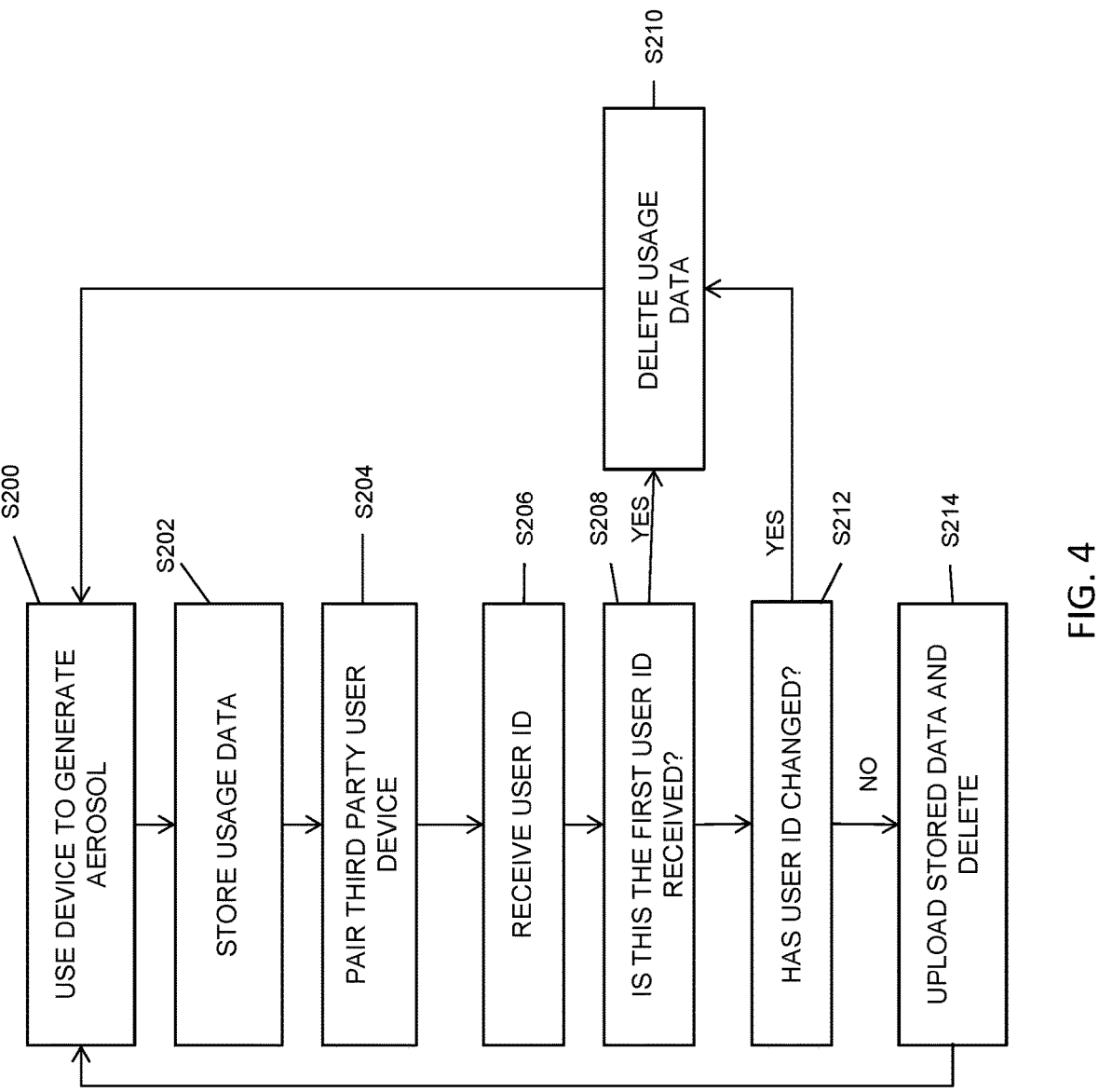
FIG. 4 is a flow diagram showing a sequence of steps to be undertaken in an aerosol generation device in another embodiment of the invention.

FIG. 4 is another exemplary flow diagram showing a sequence of steps that can be undertaken in another embodiment of the present invention. At step S200 the device 2 is used for its normal purpose, which is to generate an aerosol for inhalation by a user. Usage data are gathered by the sensors 116 and at step S202 usage data are stored in the data storage unit 114, including puff data records and event data records.

At step S204 the aerosol generation device 2 is paired with a user computation device 4, 6, 8, in the manner discussed previously in relation to step S108. Upon successful pairing the user computation device 4, 6, 8, transmits a user ID or some other token or key that is indicative of the user to the aerosol generation device 2. The user ID is received at the aerosol generation device 2 at step S206 and is stored in the data storage unit 114. The user ID is typically generated when a user account is established for the aerosol generation device 2 using an application on the user computation device.

In order to pair a user computation device with an aerosol generation device, the user needs a user account with a unique user ID on an application associated with the aerosol generation device, which is downloaded and installed onto their user computation device. In one embodiment, for each time of pairing, the user needs to input the user ID on the application running on the computation device, and also accept Terms and Conditions for allowing storage and transferring of usage data on the aerosol generation device. In another embodiment, the user account is created and stored on a remote server. In addition to the user ID, the user account may also include various pieces of user information such as name of the user, age of the user, birth date of the user, email of the user, password of the user. The account creation process on the remote server comprises receiving user's identification information to authenticate the user and also user's confirmation input of accepting Terms and Conditions of allowing usage data on the aerosol generation device to be created and transmitted to computation device associated with the same user account. The user registration request is transmitted from the personal computation device to a remote server. The remote server creates the account and stores the user identification information in the user database. Each time the user intends to pair a computation device with an aerosol generation device, the user needs to log into the application running on the computation device, and user identity associated with the log on data is transferred from the remote server to the computation device. In turn, the computation device will transfer the received user identity to the aerosol generation device for comparison with the user ID locally stored on the aerosol generation device. Alternatively, the user ID is stored with the application on the computation device, and after the user log on to the application, the computation device retrieves the user ID associated with the log on data from its local storage and transmits the user ID to the aerosol generation device.

At step S208 the processor 108 determines whether the user ID is the first to have been received by the device 2. This can be accomplished because user IDs for successfully paired devices are stored automatically in the data storage unit 114. If there are no stored user IDs in the data storage unit 114 then it can be determined at step S208 that no user IDs have been received to date and at step S210 any usage data stored in the data storage unit 114 are deleted. This ensures protection of the data that were recorded before any user IDs were received.

At step S212 the processor 108 determines whether the received user ID has changed. This is achieved by comparing the received user ID with the user ID that was most recently stored in the data storage unit 114. Where the processor 108 detects a difference then it can determine that there has been a change of user. In these circumstances, at step S210, any usage data stored in the data storage unit 114 are deleted. This ensures that usage data created by one user cannot be transferred to or accessed by a user computation device associated with a different user.

It is also possible at step S212 that the processor 108 can determine that the received user ID matches the user ID that was most recently stored in the data storage unit 114. In these circumstances it can be concluded that there has been no change in user ID and, at step S214, usage data stored in the data storage unit 114 are uploaded to the paired user computation device 4, 6, 8. Data records are uploaded one-by-one and are deleted from the data storage unit 114 immediately after they are uploaded. The flow chart is then returned to step S200 so that the user can, once more, use the device to generate an aerosol.

It is notable that the user ID received at step S206 can be independent of the user computation device. For example, the same user may have a number of user computation devices such as a work smartphone, a personal smartphone and a personal computer. The user may wish to pair the aerosol generation device 2 with any one of these user computation devices, without deleting usage data that have been stored in the data storage unit 114. This may also allow the user to start using a new phone without deleting any usage data. This is achieved in the embodiment of FIG. 4 by deleting usage data only if the user ID has changed, even if the aerosol generation device 2 is paired with a different user computation device 4, 6, 8.

It is notable that steps S208 and S212 may be combined in a single step. At step S212 the processor 108 determines whether there has been a change in the received user ID. A change in the received user ID may be detected when a user ID is received for the first time; this would amount to a detected difference between the received user ID and the empty slot for a user ID in the data storage unit 114. Following this procedure, only a single step may be required.

Usage data are protected in the event that a user misplaces the aerosol generation device 2. In these circumstances, if a new person attempts to pair a user computation device with the aerosol generation device then the usage data will be deleted. In the embodiment of FIG. 3 this is achieved by determining that the MAC address of the new user computation device does not match the MAC address of the most recently paired user computation device at step S110. In the embodiment of FIG. 4 the same result is achieved by determining at step S212 that the user ID has changed when the new person pairs their user computation device. Both circumstances result in deletion of previous usage data to the benefit of the original user.

Of course, the steps in the flow chart of FIGS. 3 and 4 may be combined as appropriate. For instance, it would be possible to insert aspects of steps S102 and S104 in FIG. 4 so that the storage of usage data is inhibited in the aerosol generation device 2 until a first user ID is received from a paired user computation device.

Figure 5:
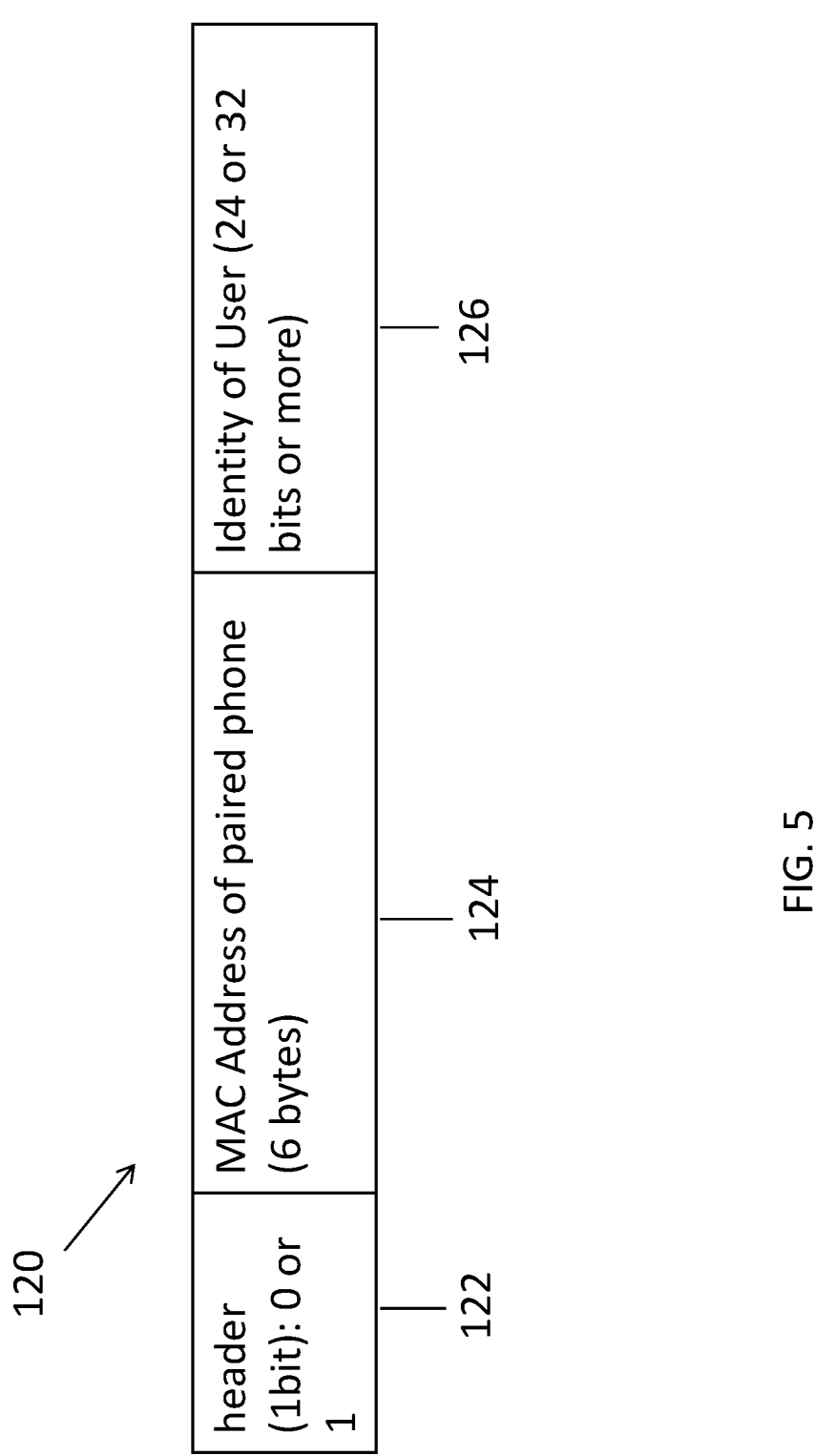
FIG. 5 is an example of a flag that can be set in the data storage unit of an aerosol generation device in an embodiment of the invention.

FIG. 5 is an example of a flag 120 that can be stored in the data storage unit 114. The properties of the flag 120 can be adjusted dynamically by the processor 108. In this example the flag 120 includes a header 122 which is one bit (i.e. is set to 0 or 1). The header 122 can be set to 0 to indicate that no user computation device has ever been paired with the aerosol generation device 2. The processor 108 can change the header 122 to 1 when a user computation device is first paired with the communicative interface 118. In this way, the processor 108 can check the header 122 of the flag 120 at step S102 to determine whether the device 2 has ever been paired with a user computation device. The flag 120 includes a first data portion 124 which stores the MAC address of the most recently paired user computation device. The first data portion 124 is generally 6 bytes, which comprises six groups of two hexadecimal digits, but may be modified as required in dependence on the expected properties of the user computation devices. In one example the MAC address is a standard EUI-48 address comprising six groups of two hexadecimal numbers, an example being CE:51:7E:EA:17:E0. In this way, the processor 108 can check the first data portion 124 of the flag 120 at step S110 to determine whether there is a change in identity of the paired user computation device. The flag 120 also includes a second data portion 126 which stores the user ID that is received at step S206. In general the user ID is 24 or 32 bits, but this may be adjusted depending on the preferred properties of the user ID. In this way, at step S208 the processor 108 can determine whether a received user ID is the first received user ID. Additionally, at step S212 inspection of the second data portion 126 can reveal to the processor 108 whether the user ID has changed.

The flag header 122 therefore acts as a status of the flag 120, the status being set in the data storage unit 114. The status of the flag can take one of two statuses, namely a status indicating that a user computation device 4 has successfully paired with the interface 118 (in this case the header 122 is set to 1), and a status indicating that a user computation device 4 has not been paired with the interface 118 (in this case the header 122 is set to 0).

The status of the flag 120 is used to determine whether the data storage unit 114 stores data or does not store data. The status of the flag 120 can therefore be thought of as at least partially controlling at least one function of the data storage unit 114. In particular, if the flag status indicates that a user computation device 4 has successfully paired with the interface 118 then storage of data in the data storage unit 114 is enabled. Conversely, if the flag status indicates that a user computation device 4 has not paired with the interface 118 then storage of data in the data storage unit 114 is inhibited.

It should be noted that the status of the flag does not determine, or control, whether the data is collected from the sensors 116 in the first place. The status of the flag only determines whether or not this data is stored within the data storage unit 114.

For example, in some developments, if the flag status indicates that a user computation device 4 has not paired with the interface 118, usage data may still be gathered by the sensors 116 but this data will not be stored within the data storage unit 114. In this case, the sensors 116 remain activated, or are activated if they are not already active, but the detected data (such as puff and event data) are never committed to read only memory in the data storage unit 114.

Alternatively, in other developments, if the flag status indicates that a user computation device 4 has not paired with the interface 118, usage data may not be gathered by the sensors 116. In this case, the sensors 116 are deactivated, or remain deactivated if they are not already active, to prevent data being recorded for any usage events.

The status of the flag 120 also does not determine, or control, whether the aerosol generation device 2 can be used or not. In fact, the aerosol generation device 2 can be operated by a user independently of the status of the flag 120. Said another way, usage of the aerosol generation device 2 by a user to generate an aerosol is enabled irrespective of the status of the flag 120. For example, if the flag status indicates that a user computation device 4 has not paired with the interface 118, the user is still able to use the aerosol generation device to generate a vapour. In addition, even though no computation device 4 has been paired with the interface 118, usage data may still be gathered by the sensors 116, as described above, but this data will not be stored within the data storage unit 114.

The function of operating the aerosol generation device 2 and the function of how the data storage unit 114 behaves are therefore two distinct functions of the aerosol generation device 2 which are independent from each other. The ability of the aerosol generation device 2 to be used is therefore not inhibited or affected in any way by the ability of the data storage unit 114 to store data i.e. whether a data storage function of the data storage unit 114 is enabled or inhibited. This is important because a user should be allowed to use the aerosol generation device 2 even if they do not want their usage data stored. Usage data is private data associated with a particular user and this data should not be stored unless a user has given their authorisation for the aerosol generation device to store this data. If the aerosol generation device 2 were to store usage data associated with a user without their authorisation, there is a risk of data leakage to unauthorised persons.

As explained earlier, upon successful pairing the user computation device 4 transmits a form of user ID that is uniquely associated with the user to the aerosol generation device 2 which stores the received user ID in the data storage unit 114. The user ID is typically generated when a user account is created for the aerosol generation device 2. As well as authenticating the user, the account creation process comprises receiving the user's acceptance of the Terms and Conditions relating to usage data, including the storage and transfer of usage data.

Thus, the authentication process, including acceptance of the Terms and Conditions, is only carried out once when the user first pairs the aerosol generation device 2 with the user computation device 4. These steps are not carried out each time the user uses the aerosol generation device 2.

Advantageously, use of the aerosol generation device 2 is not dependent or linked to the authentication process. This means that the user can still use the aerosol generation device 2 even if the authentication process has not been carried out, because this latter process is only relevant for data storage. In summary, the aerosol generation device 2 described herein only stores data once a user has successfully paired the aerosol generation device 2, but still allows the user to actually use the aerosol generation device 2 (and not store data) regardless of whether the aerosol generation device 2 has been paired. Use of the device is not dependent on the user agreeing, or disagreeing, with the Terms and Conditions.

The invention claimed is:

1. An aerosol generation device configured to generate an aerosol for inhalation by a user, the device comprising:
a data storage unit configured to store data relating to user interactions with the aerosol generation device;
an interface configured to establish a communicative pairing with a user computation device; and
a controller configured to alter a status of the data storage unit based on a status of a flag that is settable by the controller in the data storage unit, the flag indicating a status of the communicative pairing between the interface and the user computation device,
wherein the controller is configured to enable storage of the data in the data storage unit when the flag indicates that the user computation device has successfully paired with the interface, and the controller is otherwise configured to inhibit storage of the data in the data storage unit.

2. The aerosol generation device of claim 1, wherein the controller is configured to delete the data relating to user interactions with the aerosol generation device that were previously stored in the data storage unit when the flag indicates that a user computation device associated with a new user is successfully paired with the interface.

3. The aerosol generation device of claim 2, wherein, following the deletion of the data, the controller is configured to store additional data relating to interactions with the aerosol generation device.

4. The aerosol generation device of claim 3, wherein the controller is configured to send the stored data to the user computation device using the interface when the user computation device associated with the new user is paired.

5. The aerosol generation device of claim 2, wherein the controller is configured to store an indication of the new user when the user computation device associated with the new user is successfully paired with the interface.

6. The aerosol generation device of claim 5, wherein the indication is received from the user computation device via the interface.

7. The aerosol generation device of claim 6, wherein the controller is configured to compare the indication received from the user computation device with a stored indication in the data storage unit in order to determine whether the communicative pairing is with the user computation device associated with the new user.

8. The aerosol generation device of claim 1, wherein the interface is configured to establish the communicative pairing with the user computation device using a wireless protocol.

9. The aerosol generation device of claim 1, further comprising one or more sensors configured to detect the user interactions, wherein the one or more sensors are deactivated when storage of the data in the data storage unit is inhibited.

10. The aerosol generation device of claim 1, further comprising one or more sensors configured to detect the user interactions, wherein storage of the data relating to the detected user interactions in the data storage unit is prevented when storage of the data in the data storage unit is inhibited.

11. The aerosol generation device of claim 1, wherein the controller is configured to send the stored data to the user computation device using the interface when the user computation device is paired.

12. The aerosol generation device of claim 1, wherein the status of the flag does not determine whether the aerosol generation device can generate aerosol.

13. The aerosol generation device of claim 1, wherein the controller is configured to inhibit storage of usage data in the data storage unit during aerosol generation when the flag indicates that the interface has not successfully paired with any user computation device.

14. The aerosol generation device of claim 13, wherein the controller is configured to enable storage of the usage data in the data storage unit during aerosol generation when the flag indicates that the interface has successfully paired with the user computation device.

15. A method of using an aerosol generation device that can generate an aerosol for inhalation by a user, the method comprising the steps of:
providing a data storage unit configured to store data relating to user interactions with the aerosol generation device;
establishing a communicative pairing with a user computation device associated with a new user, using an interface of the aerosol generation device; and
altering a status of the data storage unit based on a status of a flag that is settable by a controller in the data storage unit, the flag indicating the status of the communicative pairing between the interface and the user computation device,
wherein, when the flag indicates that the user computation device has successfully paired with the interface, the controller enables storage of the data in the data storage unit, and the controller otherwise inhibits storage of the data in the data storage unit.

16. A non-transitory computer readable memory product comprising executable instructions that when executed by a computer cause the computer to undertake steps comprising:
establishing a communicative pairing with a user computation device associated with a new user, using an interface of an aerosol generation device; and
altering a status of a data storage unit based on a status of a flag that is settable by a controller in the data storage unit, the data storage unit being configured to store data relating to user interactions with the aerosol generation device, and the flag indicating the status of the communicative pairing between the interface and the user computation device,
wherein, when the flag indicates that the user computation device has successfully paired with the interface, the controller enables storage of the data in the data storage unit, and the controller otherwise inhibits storage of the data in the data storage unit.

* * * * *